United States Patent
Schoeffel et al.

[11] Patent Number: 6,062,067
[45] Date of Patent: May 16, 2000

[54] APPARATUS FOR MEASURING HYDRAULIC FLOW QUANTITIES AND LEAKS IN A SPECIMEN

[75] Inventors: Eberhard Schoeffel; Klaus Kropf, both of Bamberg; Josef Ernst, Eggolsheim; Josef Seidel, Breitenguessbach, all of Germany

[73] Assignee: Robert Bosch GmbH, Stuttgart, Germany

[21] Appl. No.: 09/180,529

[22] PCT Filed: Nov. 27, 1997

[86] PCT No.: PCT/DE97/02771

§ 371 Date: Feb. 5, 1999

§ 102(e) Date: Feb. 5, 1999

[87] PCT Pub. No.: WO98/40713

PCT Pub. Date: Sep. 17, 1998

[30] Foreign Application Priority Data

Mar. 7, 1997 [DE] Germany .......................... 197 09 423

[51] Int. Cl.[7] .............. G01M 3/28; G01F 1/56; G01N 27/22
[52] U.S. Cl. .................... 73/37; 73/40; 324/69; 324/664; 340/605
[58] Field of Search .............. 73/37, 49.2, 49.1, 73/49.5, 40.5 R, 40, 335.04, 61.44; 324/690, 689, 664; 340/605, 632

[56] References Cited

U.S. PATENT DOCUMENTS

| | | | |
|---|---|---|---|
| 3,691,821 | 9/1972 | Davey | 73/49.2 |
| 4,599,890 | 7/1986 | Girone et al. | 73/37 |
| 4,708,014 | 11/1987 | Janitz | 73/37 |
| 4,788,850 | 12/1988 | Buschor et al. | 73/49.2 |
| 4,875,366 | 10/1989 | Kesler et al. | 73/118.1 |
| 5,067,345 | 11/1991 | Mougne | 73/61.1 R |
| 5,315,861 | 5/1994 | Egan et al. | 73/37 |
| 5,317,902 | 6/1994 | Steiger et al. | 73/49.2 |
| 5,375,453 | 12/1994 | Rudd et al. | 73/37 |
| 5,375,455 | 12/1994 | Maresca, Jr. et al. | 73/40.5 R |
| 5,415,033 | 5/1995 | Maresca, Jr. | 73/40.5 R |
| 5,417,107 | 5/1995 | Biencourt et al. | 73/61.44 |
| 5,419,181 | 5/1995 | Egan et al. | 73/37 |
| 5,614,660 | 3/1997 | Tanaka | 73/37 |

*Primary Examiner*—Hezron Williams
*Assistant Examiner*—J. David Wiggins
*Attorney, Agent, or Firm*—Ronald E. Greigg; Edwin E. Greigg

[57] ABSTRACT

An apparatus for measuring hydraulic flow quantities and leaks in a specimen, including a measuring section to which the specimen is coupled and a capacitive sensor disposed in the measuring section. The measuring section can be acted upon both by at least one measurement medium and by at least one pressure medium. For generating a pressure acting on the measurement medium an inlet/outlet for the measurement medium is embodied on a side of the measuring section remote from the specimen, and an inlet/outlet for the pressure medium is disposed directly on the measuring section, on a side of the measuring section toward the specimen.

13 Claims, 7 Drawing Sheets

APPARATUS FOR MEASURING HYDRAULIC FLOW QUANTITIES AND LEAKS IN A SPECIMEN

PRIOR ART

The invention relates to an apparatus for measuring hydraulic flow quantities and leaks in a specimen, including a measuring section to which the specimen is coupled and a capacitive sensor which is-disposed in the measuring section and is acted upon both by at least one measurement medium and by at least one medium (pressure medium) for generating a pressure acting on the measurement medium.

Such an apparatus is found for instance in German Patent Disclosure DE 42 05 453 A1. In this apparatus, both the measurement medium and the pressure medium are delivered to the measuring section via separate supply lines intended for them, indirectly via a compensation container. The inlet/outlet for the pressure medium and also for the measurement medium are disposed on the compensation container; the inlet of the pressure medium cannot be closed by a valve, for instance. The specimen communicates with the measuring section via a line. In such an apparatus it is problematic to measure a wide flow range. Furthermore, such an apparatus for measuring hydraulic flow quantities and leaks in specimens cannot be employed at very high pressures, since air is used as the pressure medium, which because of its compressibility necessitates adherence to stringent safety requirements.

U.S. Pat. No. 5,017,909 discloses an apparatus for capacitive detection of a liquid level that makes it possible to signal by means of a signal lamp if the liquid in a container exceeds or drops below a particular level.

Measuring a pressure prevailing in a container by visual and optical means using the liquid level of two liquids adjacent one another in a container is disclosed by U.S. Pat. No. 5,065,616.

Detecting a leak in a fluid system is also disclosed by U.S. Pat. No. 5,152,167, in which a leak is detected via a liquid level found in the reservoir, but this level is not measured capacitively.

The object of the injection is to improve an apparatus for measuring hydraulic flow quantities and leaks in a specimen of this generic type in such a way that in a technologically achieved way, measurements with different requirements are possible, such as measurements at high pressures or measurements over a wide flow range, and the like.

ADVANTAGES OF THE INVENTION

In an apparatus for measuring hydraulic flow quantities and leaks in a specimen of the type described at the outset, this object is attained according to the invention in that an inlet/outlet for the measurement medium is embodied on a side of the measuring section remote from the specimen, and an inlet/outlet for the pressure medium is disposed directly on the measuring section, on a side of the measuring section toward the specimen.

Embodying the inlet/outlet for the measurement medium and the inlet/outlet for the pressure medium directly on the measuring section has the particularly great advantage that both the measurement medium and the pressure medium can be delivered to the measuring section and thus also to the specimen very quickly and without detours. In particular, by this provision the measuring section can be acted upon directly by the measurement medium and the pressure medium. This arrangement allows a pressure in the measuring section and thus in the specimen to be set precisely.

Advantageously, the inlet/outlet for the measurement medium and the inlet/outlet for the pressure medium can be shut off by valves.

An advantageous embodiment that in particular allows many different measurement methods, provides that these valves are triggerable as a function of pressure. In an exemplary embodiment in which a wide flow range in particular is to be covered, it is provided that a compensation container can be connected parallel to the measuring section.

In another advantageous embodiment, which can be used in particular for hydraulic flow quantities in the inflow at low pressure, a pressure reservoir that can be connected via a valve that is triggerable as a function of pressure is disposed adjacent to the inlet/outlet for the measurement medium on the measuring section.

Particularly for good coupling of the measurement medium, which is under pressure, to the specimen and for easy rinsing out of any air bubbles that may arise, it is advantageously provided that a turbulizing element for generating a rotary flow in the specimen is disposed between the inflow (the high-pressure side) to the specimen and the measuring section.

With regard to the embodiment of the turbulizing element, in principle the most various forms that generate a rotary flow in the specimen are conceivable. One advantageous embodiment provides that the turbulizing element is a cylindrical disk, with openings disposed in inclined fashion in the axial and azimuthal directions. Such a turbulizing element is on the one hand especially easy to manufacture and on the other hand generates especially effective rotary flows in the specimen.

Thus far no detailed information has been provided herein on the embodiment of the measuring section or of the capacitive sensor. One advantageous embodiment provides that the measuring section takes the form of a cylinder, and that the capacitive sensor is a cylinder capacitor. In this way, the capacitive sensor, which is disposed as a cylinder capacitor in the measuring section embodied as a cylinder, can be acted upon in an especially simple way by the measurement medium and the pressure medium, since in a sense the measuring section and the capacitive sensor coincide.

Purely in principle, the most various fluids can be used as both the measurement medium and the pressure medium. In one advantageous embodiment, it is provided that the measurement medium is a hydraulic fluid, and that the pressure medium is air.

In another advantageous embodiment, it is provided that the measurement medium and the pressure medium are two liquids not miscible with one another, which have different dielectric constants and densities. If the hydraulic fluid has significant electrical conductivity, then advantageously one of the electrodes that form the capacitive sensor is provided with a thin, homogeneous electrically insulating coating.

If the capacitive sensor is a tubular capacitor, then preferably the center conductor is provided with the insulating coating.

To allow decoupling from the measuring section, it may be provided in one embodiment that a shutoff valve is disposed between the specimen and the measuring section.

BRIEF DESCRIPTION OF THE DRAWINGS

Further characteristics and advantages of the invention the subject of the ensuing description and of the drawings that show several exemplary embodiments.

Shown in the drawings are.

DESCRIPTION OF THE EXEMPLARY EMBODIMENTS

Figure 1:
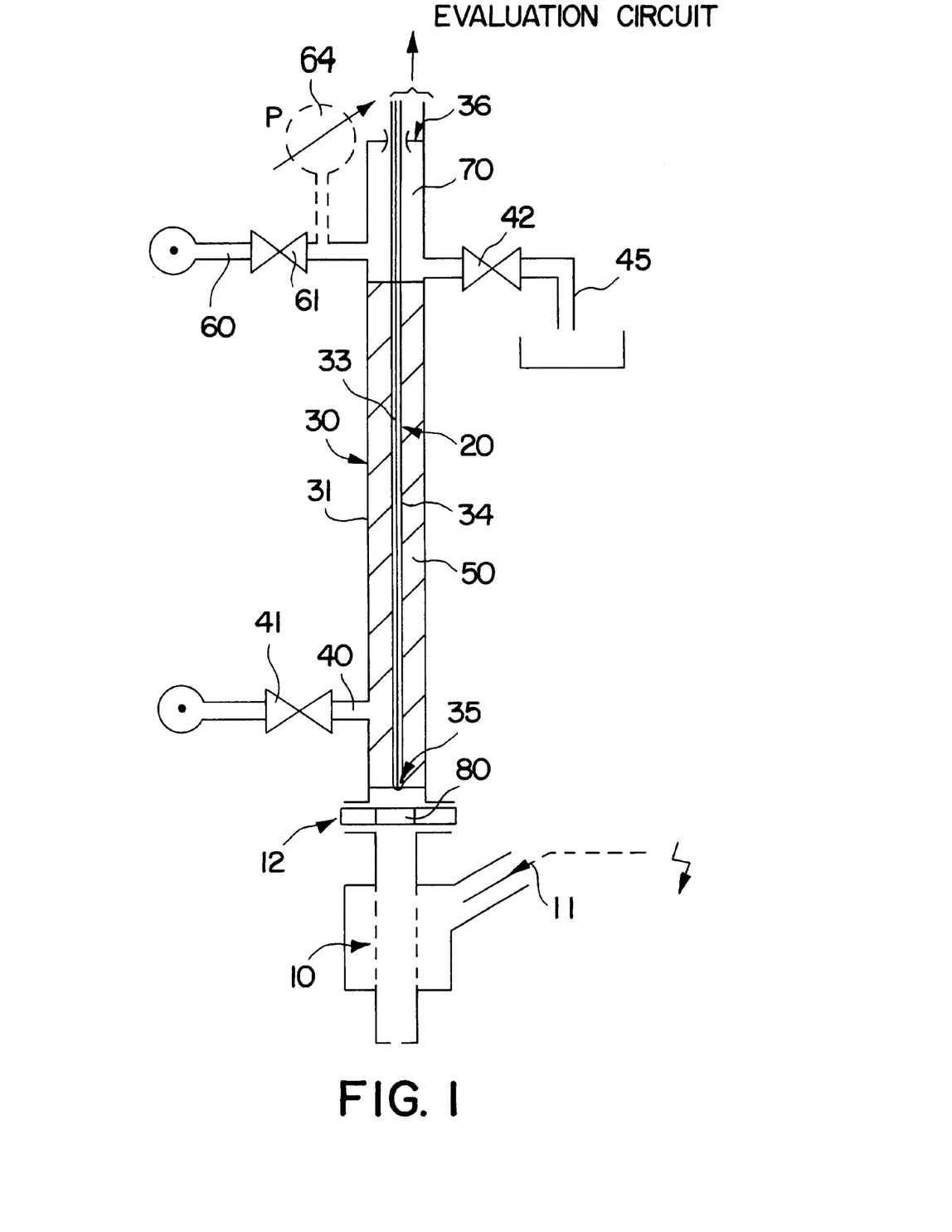
FIG. 1, a first exemplary embodiment of an apparatus according to the invention for measuring hydraulic flow quantities and leaks in a specimen.

An exemplary embodiment of an apparatus for measuring hydraulic flow quantities and leaks in a specimen 10, such as an injection valve used in automotive engineering, and shown in FIG. 1, includes a measuring section 20, which extends approximately vertically and to whose lower end the specimen 10 is coupled. In the measuring section 20 is a capacitive sensor 30 in the form of a cylinder capacitor, whose outer cylinder 31 coincides with the outer tube of the measuring section 20 and whose center conductor 33 is disposed essentially centrally in the outer cylinder 31 and thus the outer tube of the measuring section 20.

The specimen 10 is coupled to the measuring section 20 directly via a sealing element 12.

An electrically insulated, perforated center conductor fastener 35 is provided on the side of the capacitive sensor 30 toward the specimen 10.

On the side of the capacitive sensor 30 remote from the specimen 10, the center conductor 33 is extended to the outside, to an evaluation circuit to be explained in further detail below, via an electrically insulated, pressure-tight leadthrough 36.

On the side of the measuring section 20 toward the specimen 10, an inlet/outlet 40 for a measurement medium 50 is provided, by way of which the measuring section 20 and thus the capacitive sensor 30 in the form of the cylinder capacitor can be acted upon by the measurement medium 50.

If the hydraulic measurement medium 50 is electrically conductive, then the center conductor 33 is provided with a thin, homogeneous electrically insulating coating 34.

The inlet/outlet 40 of the measurement medium 50 can be closed via a valve 41 that is triggerable as a function of pressure.

Also on the side of the measuring section 20 remote from the specimen 10, an inlet/outlet 60 is provided, by way of which a medium for generating a pressure, that is, a pressure medium 70, acting on the measurement medium 50 can be delivered into the measuring section 20. The inlet/outlet 60 for the pressure medium 70 is closable via a valve 61 that can be triggered as a function of pressure. Downstream of the valve 61 is a manometer 64, which detects the pressure prevailing in the measuring section 20.

Also on the side of the measuring section 20 remote from the specimen 10, a relief/return valve 42 is provided, which in the open state allows excess measurement medium 50 to be removed from the measuring section 20 via a line 45.

A turbulizing element 80 for generating a rotary flow in the specimen 10 is also disposed between the specimen 10 and the measuring section 20 and thus the capacitive sensor 30. As a result of this rotary flow, bubbles or the like in particular, which can arise on impingement of the measurement medium 50 on the specimen 10, are flushed out of the measurement medium 50 and the specimen 10. To that end, the specimen 10 is briefly opened, via the electric trigger line 11. The turbulizing element takes the form of a cylindrical disk with openings (not shown) inclined in the axial and azimuthal directions.

In the apparatus shown in FIG. 1, which is suitable in particular for flow measurement in the low-pressure range (2 to 10 bar), a hydraulic fluid 50 is preferably used as the measurement medium 70, and air is preferably used as the pressure medium. The center conductor 33 has a diameter of approximately 0.5 mm, while the outer cylinder 30 conversely has a diameter of approximately 2 mm. Prior to the measurement, the measuring section 20 is filled. For measurement, the valves 41, 42 are closed while the valve 61 in the inlet/outlet 60 of the pressure medium 70 is opened. In this way, the measuring section 20 is acted upon by a test pressure p, which is detected by the manometer 64. The specimen 10 is now opened under the control of a control line 11, and the level of measurement medium 50 is detected by the capacitive sensor 30 and carried on to an evaluation circuit to be described in further detail hereinafter.

The level in the measuring section 20 and thus in the capacitive sensor 30 in the form of the cylinder capacitor is a measure for the flow quantity or for a leak in the specimen 10.

Figure 2:
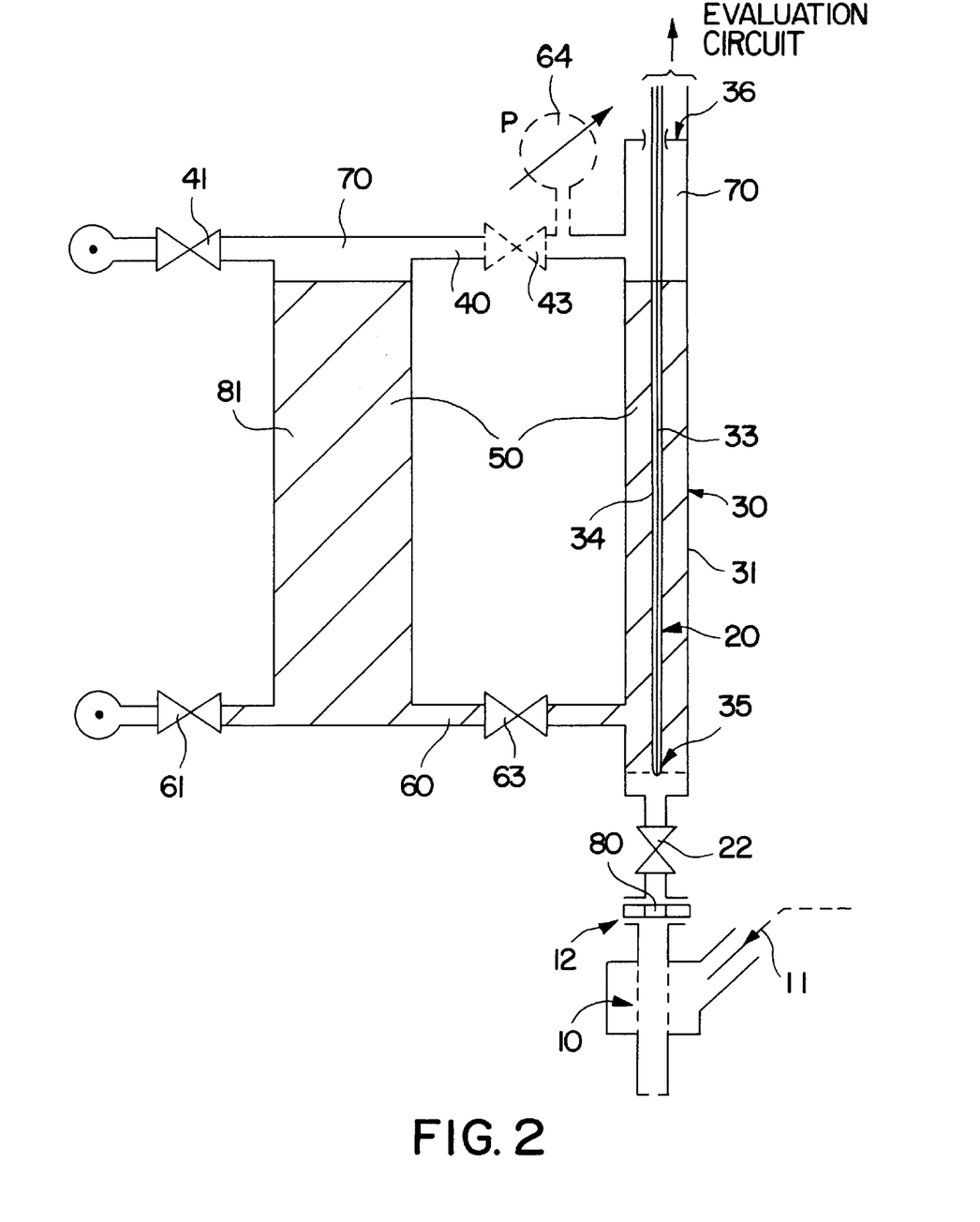
FIG. 2, a second exemplary embodiment of an apparatus according to the invention for measuring hydraulic flow quantities and leaks in a specimen.

In a second exemplary embodiment, shown in FIG. 2, those elements that are identical to elements in the first exemplary embodiment are provided with the same reference numerals so that with regard to their description, reference is made to the full content of the description of the first exemplary embodiment. The exemplary embodiment shown in FIG. 2 of an apparatus for measuring hydraulic flow quantities and leaks differs from that shown in FIG. 1 in that a compensation or supply container 81 can be connected parallel to the measuring section 20, via valves 43, 63.

In addition, a shutoff valve 22 is disposed between the measuring section 20 and where the specimen 10 is coupled to the measuring section 20, or in other words between the sealing element 12 and turbulizing element 80 and the end of the measuring section 20 toward the specimen. This apparatus is intended for measurement of flow and tightness in the inflow, that is, the high-pressure side, of a specimen 10 to be acted upon by high pressure, such as a high-pressure injection valve; test pressures between 100 and 250 bar are contemplated.

This apparatus is especially advantageous whenever a wide flow range is to be covered. In that case, the supply container is connected to the measuring sensor; that is, the valves 43, 63 are open during the measurement. Furthermore, this apparatus is used particularly when large flushing quantities are to be furnished. Once again, during the flushing, the compensation and supply container 81 is connected parallel to the measuring sensor 20.

The apparatus also makes it possible to perform measurement with an enclosed gas volume. During the measurement, all the valves except for the valve 43 are closed. In this way, a defined gas volume develops in the upper region of the measuring sensor 20, acted upon by the pressure medium 70, and also in the upper region of the compensation and supply container that is acted upon by the pressure medium 70. This gas volume can be compressed by delivering the medium via opened valves 61, 63. This compression creates a pressure p above the measurement medium 50 that can be employed for measuring the specimen 10. During the measurement, with the valve 63 closed, measurement medium 50 can be delivered to the compensation and supply container via the opened valve 61 as a function of the pressure p detected by the manometer 64. After closure of the valve 61 and opening of the valve 63, the level of measurement medium 50 in the measuring section 30 is equalized on the principle of communicating tubes. The above-described measuring method is particularly advantageous when the measuring pressures are very high, since the gas volume is preserved unchanged. Filling the apparatus can be done at low pressure on the part of the pressure medium 70, if the apparatus is first filled entirely with the pressure medium 70, that is, a gas, and the valve 41 is then closed and the high pressure generation is done by delivering measurement medium 50 through the open valves 61, 63. In this apparatus as well, the measuring section 20 can be filled very rapidly.

Figure 3:
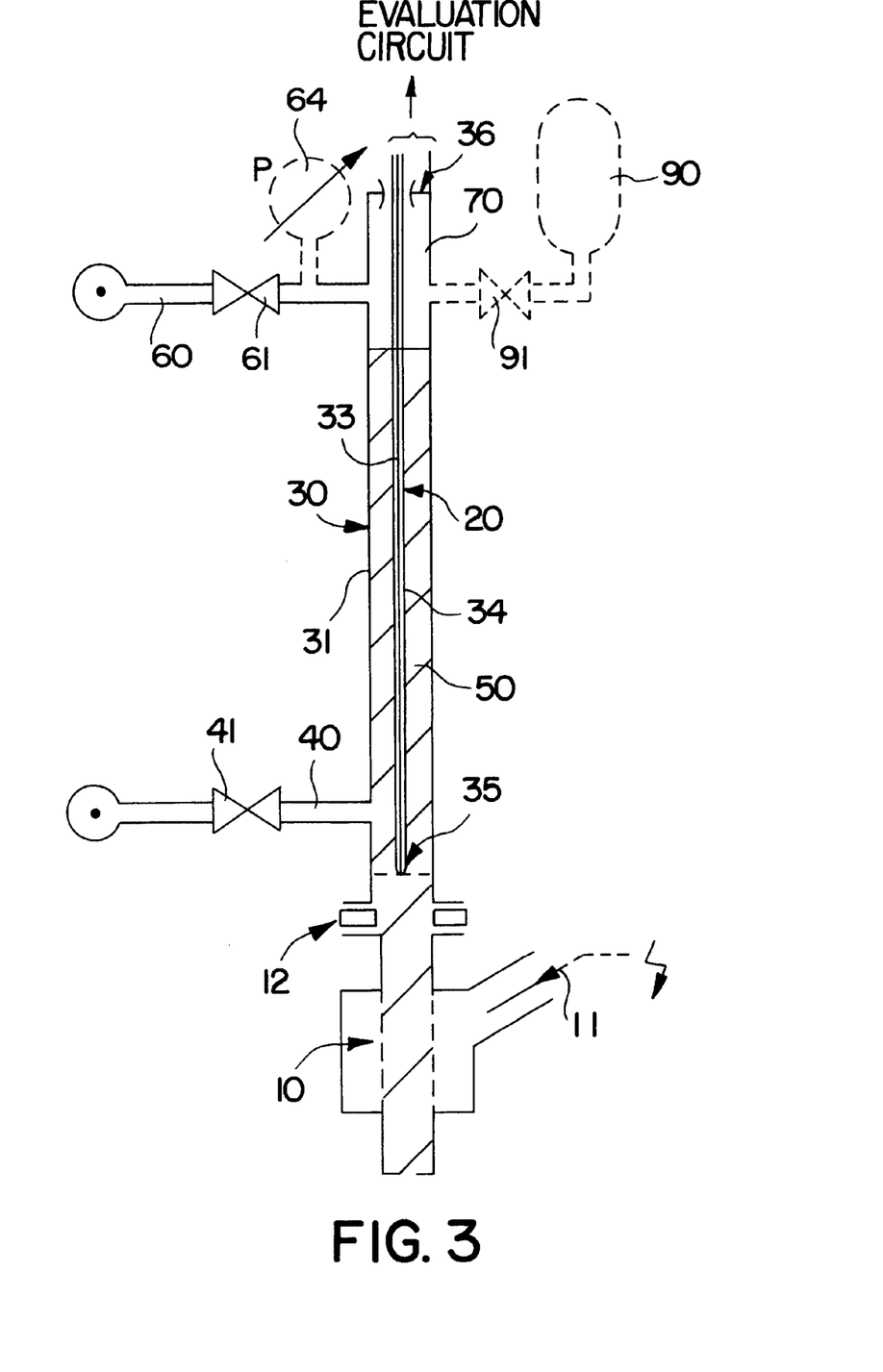
FIG. 3, a third exemplary embodiment of an apparatus according to the invention for measuring hydraulic flow quantities and leaks in a specimen.

In a third exemplary embodiment, shown in FIG. 3, those elements identical to elements in the first embodiment are provided with the same reference numerals, so that with regard to their description, reference is made to the full content of the description of the first exemplary embodiment.

The exemplary embodiment shown in FIG. 3 differs from that shown in FIG. 1 in that instead of a return valve disposed on the side of the measuring section 20 remote from the specimen 10, a pressure reservoir 90 is provided, which can be connected to the measuring section 20 via a valve 91 that is triggerable as a function of pressure.

This apparatus is used particularly for hydraulic flow quantities in the inflow to the specimen 10 at low pressure, that is, at a test pressure of 2 to 10 bar. The control of the valves 61, 41 and 91 is dependent on the pressure p detected by the manometer 64, in such a way that measurement medium 50 never reaches the uppermost region of the measuring section 20. The apparatus allows a low pressure of the pressure medium 70, for instance if gas is used as the pressure medium 70, such as a low pneumatic pressure, to be compressed by means of a higher pressure of the measurement medium 50 into the pressure reservoir 90. The column of measurement medium 50 here acts as a piston.

An especially advantageous feature of this apparatus is that only a slight quantity of gas is lost per measurement cycle, since the valve 91 is closed after the measurement. Using this apparatus is moreover advantageous whenever a pressure supply, such as a pneumatic supply, for generating the pressure prevailing in the pressure medium 70 does not function in stable fashion.

Furthermore, by means of this apparatus a higher pressure of the pressure medium 70 can easily be generated with the aid of the measurement medium 50.

In the apparatuses shown in FIGS. 1–3, a hydraulic fluid is used as the measurement medium 50, while a gas is conversely used as the pressure medium 70.

Figure 4:
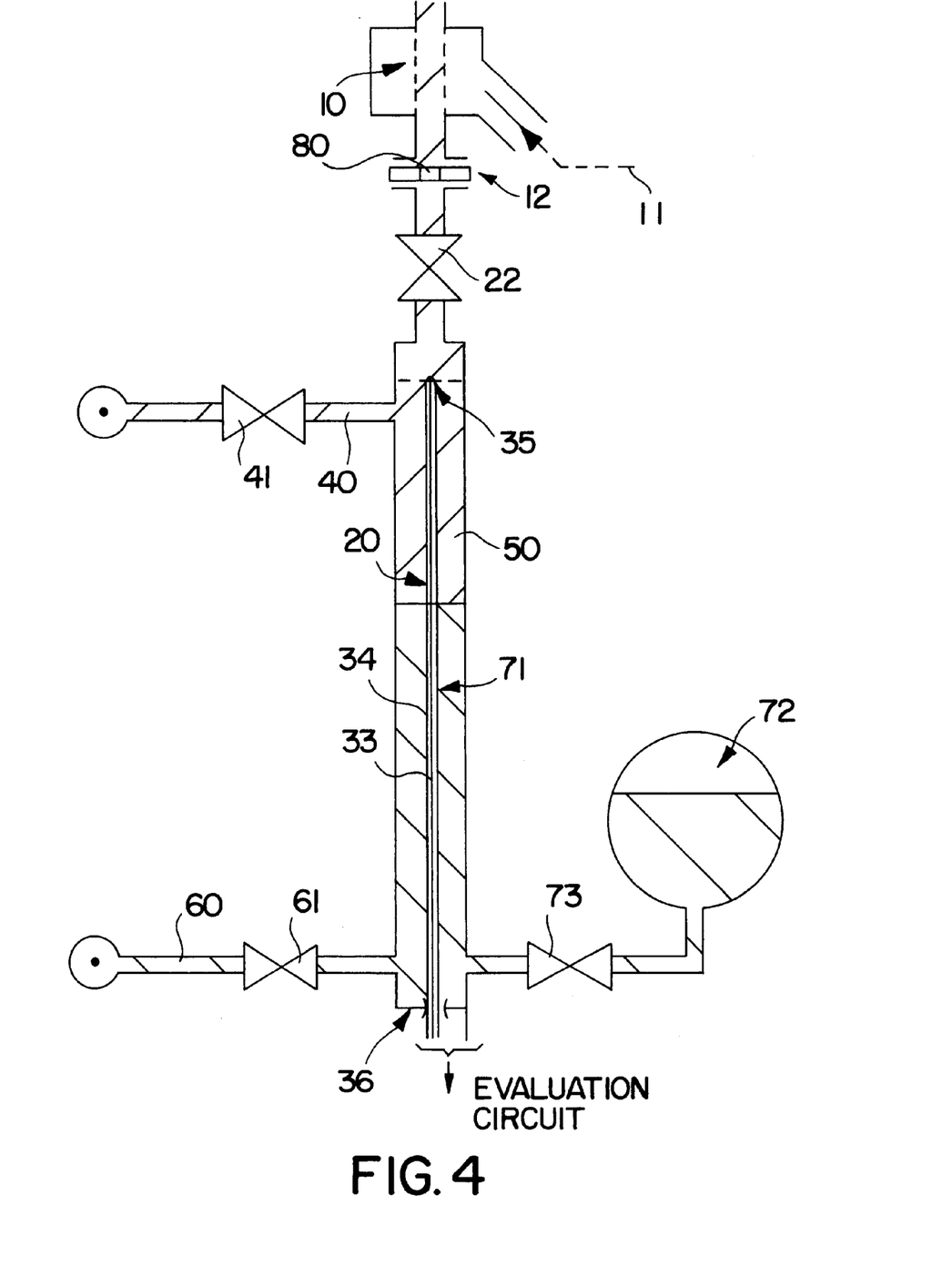
FIG. 4, a fourth exemplary embodiment of an apparatus according to the invention for measuring hydraulic flow quantities and leaks in a specimen.

However, an apparatus for measuring hydraulic flow quantities and leaks is also conceivable in which the measurement medium 50 and the pressure medium 70 are two conductive liquids, such as hydraulic liquids, that are immiscible with one another. One exemplary embodiment of such an arrangement is shown in FIG. 4. The embodiment shown in FIG. 4 differs from that shown in FIG. 1 in that instead of a gaseous or in other words compressible pressure medium 70, a noncompressible liquid pressure medium 71 is used, which has a higher density than the measurement medium 50. The latter is delivered as described above, on the side of the measuring section 20 remote from the specimen 10, via the inlet/outlet 60 with the aid of the pressure-dependently triggerable valve 61. At approximately the same height along the measuring section 20, a pressure equalization vessel 72 that can be connected to a valve 73 is also provided; it is at least partly filled with the pressure medium 71. The specimen 10 can be decoupled from the measuring section 20 via a shutoff valve 22.

In the event that one of the two hydraulic measurement mediums 50, 71 has significant electrical conductivity, the center conductor 33 is provided with a thin, homogeneous electrically insulating coating 34.

The advantage of this apparatus is that it can be used up to extremely high pressures (on the order of magnitude of 1000 bar). This apparatus is especially advantageous whenever, for instance for safety reasons, a gaseous pressure medium 70 cannot be used, or a gaseous pressure medium 70 is soluble in the measurement medium 50 at high pressures. Testing the specimen 10 for tightness or measurement of a flow quantity is done in the manner described in conjunction with the first exemplary embodiment (FIG. 1).

Figure 5:
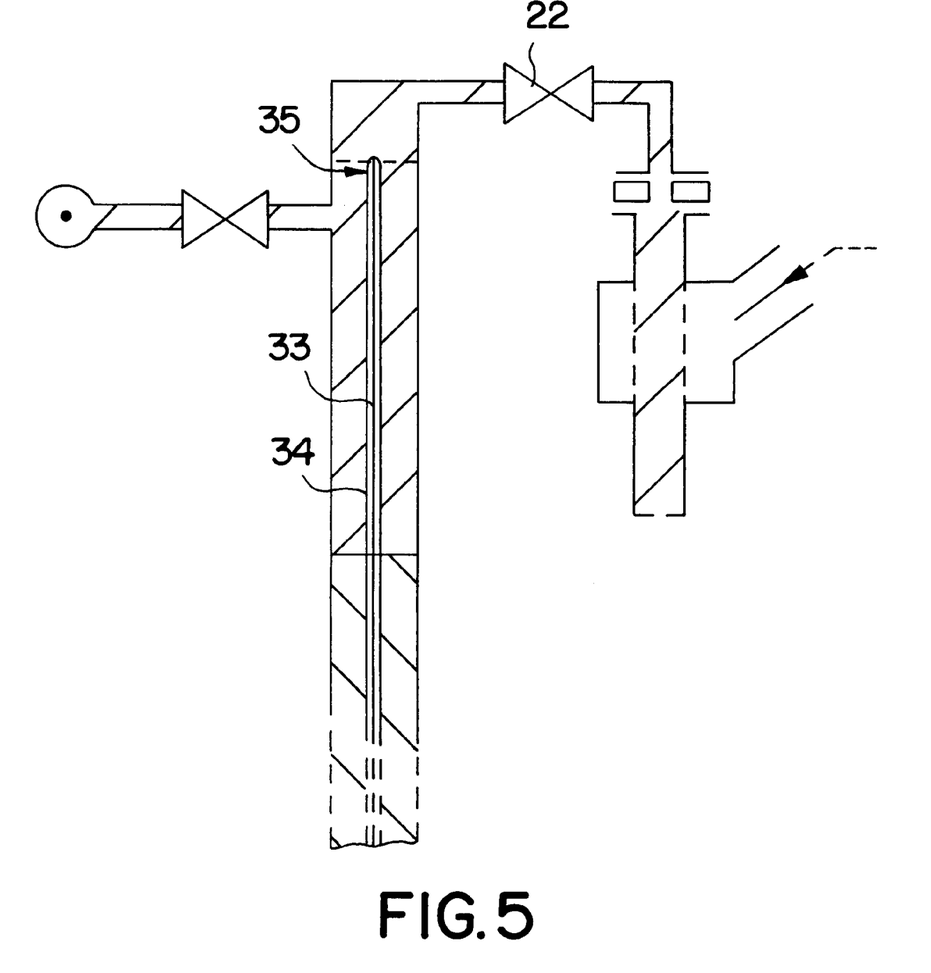
FIG. 5, another coupling of the specimen to the measuring section, in the exemplary embodiment shown in FIG. 4 of an apparatus according to the invention for measuring hydraulic flow quantities and leaks in a specimen.

The embodiment shown in FIG. 5 differs from that in FIG. 4 only in that the specimen "spurts out" not at the top but at the bottom, by deflection by 180°.

Figure 6:
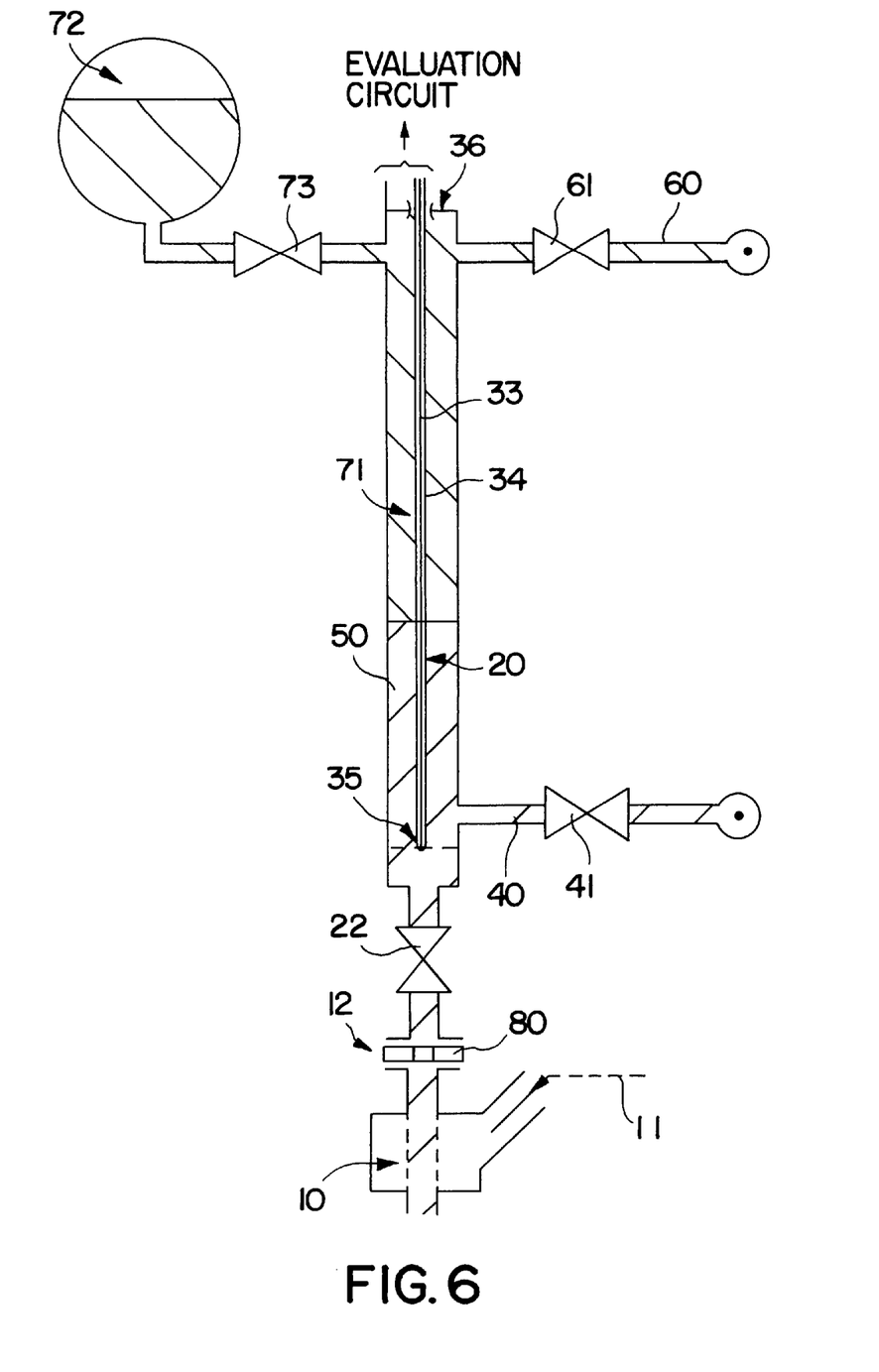
FIG. 6, a further coupling of the specimen to the measuring section, in the exemplary embodiment shown in FIG. 4 of an apparatus according to the invention for measuring hydraulic flow quantities and leaks in a specimen.

The embodiment shown in FIG. 6 differs from that in FIG. 5 in that the pressure medium 71 has a lesser density than the measurement medium 50. Those elements identical to elements of the exemplary embodiment shown in FIG. 5 are provided with the same reference numerals, so that with regard to their description, reference is made to the full content of the description of the first exemplary embodiment.

Figure 7:
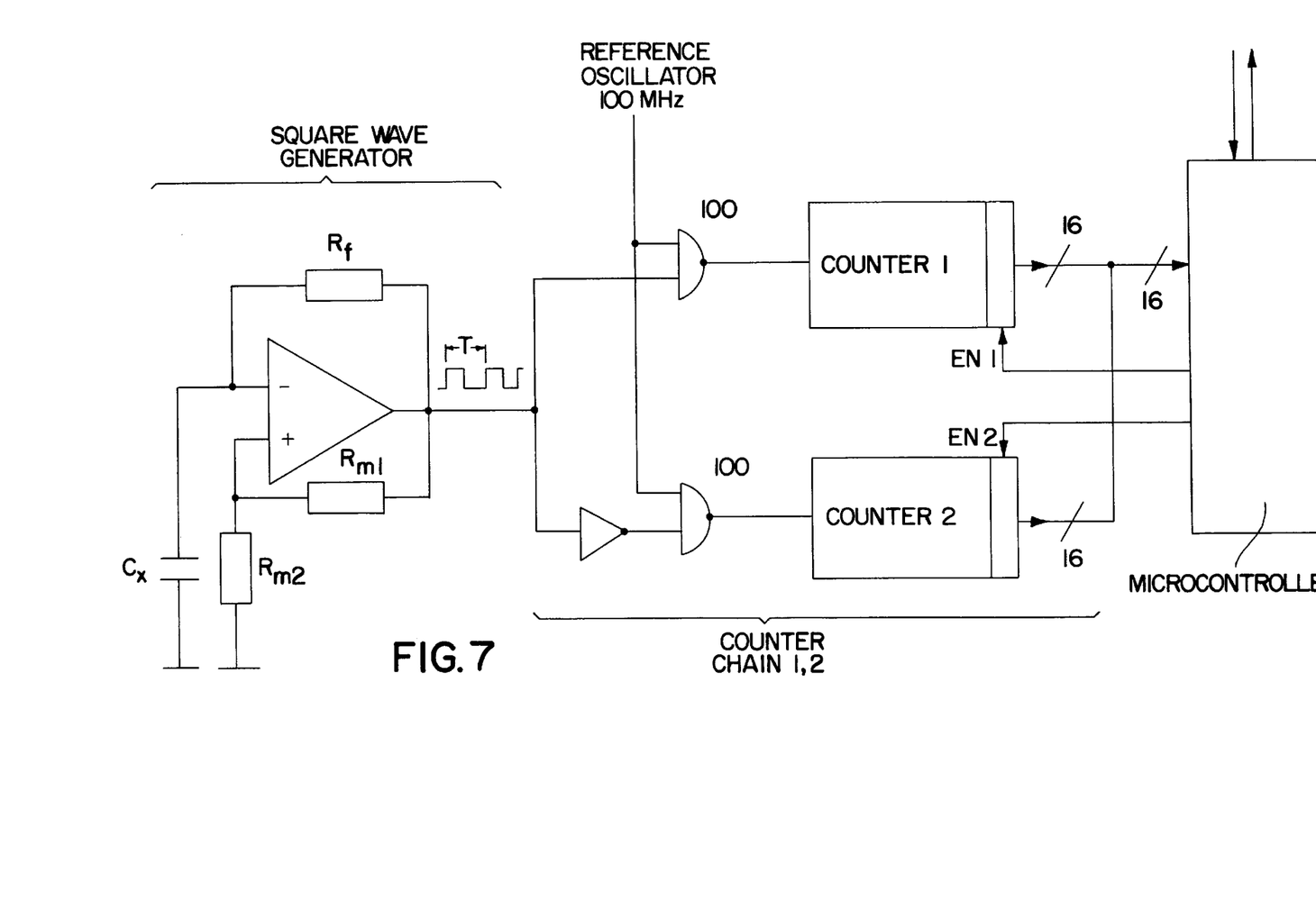
FIG. 7, a basic circuit diagram of an evaluation circuit, which can be used in the apparatuses of the invention, shown in FIGS. 1–6, for measuring hydraulic flow quantities and leaks.

The measurement of the capacitance of the capacitive sensor 30 disposed in the measuring section 20 is done as schematically shown in FIG. 7. The capacitive sensor Cx, together with positive and regenerative feedback resistances Rf, Rm1, Rm2, is the frequency-determining element of a measurement oscillator (square wave generator) known per se. The resultant period length T of the oscillator is directly proportional to Cx. With a capacitance Cx of approximately 20 pF, a positive feedback resistance Rf=5 MΩ and regenerative feedback resistances Rm1, Rm2=230 kΩ, T for instance becomes 230 µs, or in other words an oscillator frequency F of approximately 4.3 kHz. The measurement oscillator signal, corresponding to the sensor capacitance, is delivered to two counter chains, which each include one counter 1 and one counter 2; the signal delivered to the counter 2 is inverted. Each of the counter chains is preceded by a respective NAND gate 100 with two inputs. To one of the two inputs of each NAND gate, a common 100 MHz signal of a reference oscillator is applied; this signal is generated via a quartz oscillator component, known per se. The NAND gate of the counter 1 allows this 100 MHz frequency to pass through it during the time while the output of the measurement oscillator is at HIGH. Since the measurement oscillator signal used for the counter 2 is inverted, the NAND gate of the counter 2 allows the 100 MHz signal to pass through it during the LOW phase of the measurement oscillator signal.

The counters 1, 2 of the two counter chains are each 16-bit counters. A microcontroller reads out the counter states in succession.

A difference is ascertained from the readout in a preceding measurement oscillator period. This difference tells the length of the respective half (HIGH/LOW) of the measurement oscillator period in 10 ns units (with a reference frequency of 100 MHz). Adding the respectively other, previously measured half-period, after measurement of each half-period, yields the instantaneous total measurement oscillator period T in 10 ns units. For the aforementioned time constant T=230 µs, a period of approximately 23,000 thus results.

By this type of period of inter-nested readout of the counter chains, very high chronological resolution is obtained (typically approximately 120 µs). In this way, very fast measurements are possible.

For the measurement, a predetermined number of measured values are processed in a test bench computer (not shown). By means of the preselectable number of such measurements, a compensation curve with a constant term that fades in proportion to time and exponentially is drawn in accordance with the following formula:

Measured value=constant+leakiness*$t$+K*exp(-t/to).

The exponentially fading term takes into account the effects produced particularly from trapped air in the specimen 10 (adiabatic heating on imposition of the flushing/test pressure and ensuing volumetric reduction from cooling). The time constant to is dependent essentially only on the specimen 10 used, which for instance belongs to a family of injection valves, and can therefore be determined with general validity beforehand. The variable K is a measure for the volume of the trapped air and can be monitored.

For slow measurements, typically eighty (80) measurement oscillator periods per measured value detection are read out. On averaging over the last ten measurements at intervals typically of 50 to 200 µs, a measured value of approximately 18,000,000 is obtained for a well-filled sensor. For an empty sensor, the measured value is approximately 15,000,000. Thus the fill extent of the sensor can also be detected; that is, disruptions in the supply of the measurement medium 50, a large leak of the specimen 10, excessively high amounts of trapped air, and so forth can be detected.

The foregoing relates to a preferred exemplary embodiment of the invention, it being understood that other variants and embodiments thereof are possible within the spirit and scope of the invention, the latter being defined by the appended claims.

We claim:

1. An apparatus for measuring hydraulic flow quantities and leaks in a specimen (10), comprising a measuring section (20) to which the specimen (10) is coupled and a capacitive sensor (30) disposed in the measuring section (20), said measuring section (20) is acted upon both by at least one measurement medium (50) and by at least one pressure medium (70) for generating a pressure acting on the measurement medium (50), an inlet/outlet (60) for the pressure medium (70) is disposed directly on the measuring section (20), on a side of the measuring section (20) remote from the specimen (10), and a turbulizing element (80) for generating a rotary flow in the specimen (10) is disposed between the inflow to the specimen (10) and the measuring section (20).

2. An apparatus for measuring hydraulic flow quantities and leaks in a specimen (10), comprising a measuring section (20) to which the specimen (10) is coupled and a capacitive sensor (30) disposed in the measuring section (20), said measuring section (20) is acted upon both at least one measurement medium (50) and by at least one pressure medium (70) for generating a pressure acting on the measurement medium (50), an inlet/outlet (40) for the measurement medium (50) is embodied on a side of the measuring section (20) toward the specimen (10), and an inlet/outlet (60) for the pressure medium (70) is disposed directly on the measuring section (20), on a side of the measuring section (20) remote from the specimen (10), and said capacitive sensor (30) is provided with a center conductor (33) that includes an electrically insulating coating (34).

3. The apparatus according to claim 2, in that the inlet/outlet (40) for the measurement medium (50) and the inlet/outlet (60) for the pressure medium (70) can be shut off by first and second triggerable valves (41, 61).

4. The apparatus according to claim 3, in that the first and second triggerable valves (41, 61) are triggerable as a function of pressure.

5. The apparatus according to claim 3, in that a compensation and supply container (81) is connected in parallel with the measuring section (20).

6. The apparatus according to claim 3, in that a compensation and supply container (81) is connected in parallel with the measuring section (20).

7. The apparatus according to claim 2, in that a pressure reservoir (90) is connected via a valve (91) that is triggerable as a function of pressure is disposed adjacent to the inlet/ outlet (40) for the measurement medium (50) on the measuring section (20).

8. The apparatus according to claim 3, in that a pressure reservoir (90) is connected via a valve (91) that is triggerable as a function of pressure is disposed adjacent to the inlet/outlet (40) for the measurement medium (50) on the measuring section (20).

9. The apparatus according to claim 1, in that the turbulizing element (80) is a cylindrical disk, with openings disposed in inclined fashion in the axial and azimuthal directions.

10. The apparatus according to claim 2, in that the measurement medium (50) is a hydraulic fluid, and that the pressure medium (70) is air.

11. The apparatus according to claim 2, in that the measurement medium (50) and the pressure medium (71) are two liquids not miscible with one another, which have different dielectric constants and densities.

12. The apparatus according to claim 2, in that a shutoff valve (22) is disposed between the specimen (10) and the measuring section (20).

13. An apparatus for measuring hydraulic flow quantities and leaks in a specimen (10), comprising a measuring section (20) to which the specimen (10) is coupled and a capacitive sensor (30) disposed in the measuring section (20), said measuring section (20) is acted upon both by at least one measurement medium (50) and by at least one pressure medium (70) for generating a pressure acting on the measurement medium (50), an inlet/outlet (40) for the measurement medium (50) is embodied on a side of the measuring section (20) toward the specimen (10), and an inlet/outlet (60) for the pressure medium (70) is disposed directly on the measuring section (20), on a side of the measuring section (20) remote from the specimen (10), and the measuring section (20) takes the form of a cylinder, and that the capacitive sensor (30) is a cylinder capacitor.

* * * * *